（12）United States Patent
Tiliks et al.

(10) Patent No.: US 7,809,122 B2
(45) Date of Patent: Oct. 5, 2010

(54) SYSTEM AND METHOD FOR GENERATING CALL RECORDS BASED ON ACCOUNT CODES

(75) Inventors: Dianna Inara Tiliks, Elk Grove, IL (US); Carol Shifrin Gruchala, Naperville, IL (US); Susanne Marie Crockett, Buffalo Grove, IL (US); John Wesley Moss, Lake Zurich, IL (US); Nancy Ann Book, Naperville, IL (US); William M Moy, Wheeling, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1125 days.

(21) Appl. No.: 11/480,923

(22) Filed: Jul. 6, 2006

(65) Prior Publication Data

US 2006/0251227 A1    Nov. 9, 2006

Related U.S. Application Data

(63) Continuation of application No. 10/879,211, filed on Jun. 30, 2004, now Pat. No. 7,095,833, which is a continuation of application No. 09/987,224, filed on Nov. 14, 2001, now Pat. No. 6,792,089.

(51) Int. Cl.
    *H04M 15/00*    (2006.01)
(52) U.S. Cl. .............. 379/126; 379/114.28; 379/121.01
(58) Field of Classification Search ................. 379/111, 379/112.01, 112.06, 114.01, 114.28, 121.01, 379/124, 125, 127.01, 127.03, 127.06
    See application file for complete search history.

(56) References Cited

U.S. PATENT DOCUMENTS

| 4,776,004 | A |  | 10/1988 | Bauer et al. |
|---|---|---|---|---|
| 5,799,072 | A |  | 8/1998 | Vulcan et al. |
| 5,862,203 | A |  | 1/1999 | Wulkan et al. |
| 5,896,445 | A | * | 4/1999 | Kay et al. ................... 379/135 |
| 5,903,639 | A |  | 5/1999 | Lipchock et al. |
| 5,943,406 | A |  | 8/1999 | Leta et al. |
| 5,982,864 | A |  | 11/1999 | Jagadish et al. |
| 5,991,380 | A |  | 11/1999 | Bruno et al. |
| 6,023,499 | A |  | 2/2000 | Mansey et al. |
| 6,035,281 | A |  | 3/2000 | Crosskey et al. |
| 6,078,652 | A |  | 6/2000 | Barak |
| 6,205,210 | B1 |  | 3/2001 | Rainey et al. |
| 6,205,214 | B1 |  | 3/2001 | Culli et al. |
| 6,259,778 | B1 |  | 7/2001 | Corwith |
| 6,631,186 | B1 |  | 10/2003 | Adams et al. |

(Continued)

*Primary Examiner*—Binh K Tieu
(74) *Attorney, Agent, or Firm*—Greenblum & Bernstein P.L.C.

(57) ABSTRACT

A telecommunications service implements an account code reporting feature by storing an account code associated with a subscriber at a service control point (SCP) in the public switched telephone network (PSTN). When a call is initiated from the subscriber's terminal, the SCP receives outgoing call data, including the subscriber's telephone number, a called party number and an account code entered from the subscriber's terminal. The SCP determines whether the call is subject to the account code reporting service and, if so, stores the call data. The SCP transmits the call data to a service management system accessible by the subscriber via a graphical user interface through a packet switched data network and an interactive voice response through the PSTN. The call is subject to the account code reporting service when the called party number is in the same local access and transport area as the subscriber's telephone number.

20 Claims, 7 Drawing Sheets

U.S. PATENT DOCUMENTS 6,792,089 B2 9/2004 Tiliks et al.
2003/0091172 A1* 5/2003 Tiliks et al. ................ 379/126
2004/0240647 A1* 12/2004 Tiliks et al. ............ 379/114.14
2006/0251227 A1* 11/2006 Tiliks et al. ................. 379/126

* cited by examiner

ACC

Service Object Name: 3123840000        ___ 502

| 510 | 530 | 540 | 550 |
|---|---|---|---|
| Customer Telephone No. | Centrex Number Range | Verified Account Code | Unverified Account Code |
| 312-384-0000  512 | 2000-8000  532 | X   (4233)  542 | |
| 312-384-9174  514 | 9174-9177  534 | | X   (929174)  554 |

Define Capability

600 — Please add records to this table and click "Next" to continue to the next capabili
Capability: Account Codes Report       Service Object Name: 3123840000 — 502

Search:

---- 610

1 through 100 of 111 Matching
Account Codes Report(s)

| 612 | Account Code 614 | Telephone Number 616 | Billing 618 |
|---|---|---|---|
| | 4233 | 8472480000 | $7.35 |
| → | 4233 | 8472480000 | $4.77 |
| | 4233 | 8472485050 | $12.39 |
| | 4297 | 3123921234 | $2.96 |
| | 4297 | 7083559000 | $15.08 |
| | 4297 | 7083559000 | $6.38 |
| | 4297 | 6306917900 | $8.27 |
| | 4297 | 6306917903 | $11.42 |
| | 4300 | 7139609000 | $2.59 |
| | 4300 | 7139609099 | $28.48 |

620

Account Code: 4233
Telephone Number: 8472480000
Billing: $4.77

SYSTEM AND METHOD FOR GENERATING CALL RECORDS BASED ON ACCOUNT CODES

CROSS-REFERENCE TO RELATED APPLICATIONS

This application is a continuation of U.S. patent application Ser. No. 10/879,211, filed on Jun. 30, 2004 now U.S. Pat. No. 7,095,833, which is a continuation of U.S. patent application Ser. No. 09/987,224, filed on Nov. 14, 2001, which is now U.S. Pat. No. 6,792,089, the contents of which are hereby incorporated by reference in their entireties.

BACKGROUND OF THE INVENTION

1. Field of the Invention

The present invention relates to the field of telecommunications. More particularly, the present invention relates to generating and reporting call records for intraLATA calls based on account codes.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, the acronyms are defined as follows:

Advanced Intelligent Network (AIN)
Automatic Measure Assignment (AMA)
Central Exchange Service (Centrex)
Dual Tone Multi-Frequency (DTMF)
Electronic Key Telephone System (EKTS)
Graphical User Interface (GUI)
HyperText Mark-Up Language (HTML)
HyperText Transfer Protocol (HTTP)
Interactive Voice Response (IVR)
Line Information Database (LIDB)
Local Access and Transport Area (LATA)
Outgoing Call Control (OCC)
Personal Computer (PC)
Personal Call Manager/Personal Communications Manager (PCM)
Personal Identification Number (PIN)
Plain Old Telephone Service (POTS)
Private Branch Exchange (PBX)
Public Switched Telephone Network (PSTN)
Service Control Point (SCP)
Service Management System (SMS)
Service Switching Point (SSP)
Signaling System 7 (SS7)
Signaling Transfer Point (STP)
Transmission Control Protocol/Internet Protocol (TCP/IP)

3. Background Information

Presently, customers using the public switched telephone network (PSTN) receive limited information regarding outgoing telephone calls. The telephone call information received is presently based on call detail records, generated within the PSTN and includes, for example, simplified message detail recording (SMDR) records. The telephone call information is usually provided to the customers in the form of periodic bills from the network provider or telephone service provider. The call detail records, on which the telephone call information is based, are accessible by the network provider at a host central processing unit.

However, the current call detail record system has certain drawbacks. For example, specific billing information is ordinarily tracked and available for calls made from one local access and transport area (LATA) to another (i.e., interLATA or long distance calls). Billing and usage information for calls within the same LATA (i.e., intraLATA or local calls), including local toll calls, are not maintained by the network or otherwise accessible to the network provider and customers. Therefore, the customers are not able to track intraLATA calls in the same manner as interLATA calls. For example, customers may desire identifying codes to be entered next to each charged call in order to facilitate subsequent billing of the customers' respective clients.

Furthermore, the collection and dissemination of the telephone call information, on which the call detail records are based, are currently limited. The call detail records include data collected at service switching points or service control points in the PSTN. As stated above, the information is made available to the customers periodically, in a format determined by the network provider, usually based on conventional automatic measure assignment (AMA) records, e.g., monthly bills, at the provider's discretion.

Conventional attempts to provide more flexibility to the customers with respect to billing or other reporting services are likewise limited. For example, customers may initiate and modify billing services by calling a customer service representative or by interacting with an interactive voice response (IVR) system using a standard dual tone multi-frequency (DTMF) telephone device. Because these methods rely on audible presentations of the telephone call information, they limit, as a practical matter, the extent of interaction between the systems collecting and storing the call detail information and the customers.

There have been attempts to remedy the problems associated with IVR access to PSTN call detail records making the records accessible to a packet switched data network, such as the Internet or a corporate intranet, to avoid conventional IVR systems and to streamline the interactive functionality. In particular, the customers are able to access the telephone call information, stored either within the PSTN or in external databases, using a graphical user interface (GUI) connected by a web server to the Internet. The current Internet based systems have several drawbacks, however, including the inability to receive near real-time updates of telephone call information and to implement near-real time changes to the record keeping system, the inability to flexibly specify the content and format of the telephone call information received, and incompatibility with existing IVR implementations.

The present invention overcomes the problems associated with the prior art, as described below.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

The present invention relates to enabling the generation of various call reports, including billing reports, for intraLATA telephone calls based on verified and unverified account codes. The account code reporting service may be implemented individually or through a Personal Call Manager (PCM) system, disclosed in U.S. patent application Ser. No. 09/619,312 to Anil Kumar BHANDARI et al., filed on Jul. 19, 2000, the disclosure of which is expressly incorporated by reference herein in its entirety, along with other telecommunication services, such as personal directories, Internet Caller Identification (ICID), Incoming Call Manager (ICM) and Outgoing Call Control (OCC) and Flexible Call Forwarding (FCF), disclosed in U.S. patent application Ser. No. 09/716,276 to Thomas ADAMS et al., filed on Nov. 21, 2000, the disclosure of which is expressly incorporated by reference herein in its entirety. The present invention is an AIN based system and method that allows a subscriber connected to a communications network, including the Internet and other packet switched type data networks, as well as through conventional IVR systems, to customize and execute the account code reporting service, with near real-time access to the service data.

In view of the above, the present invention through one or more of its various aspects and/or embodiments is presented to accomplish one or more objectives and advantages, such as those noted below.

An aspect of the present invention provides a method for collecting and reporting calling data based on account codes. The method includes storing at least one account code corresponding to a subscriber, receiving at a service control point (SCP) outgoing call data relating to a call from a terminal of the subscriber, and determining that the call is subject to account code reporting when the called party number and the telephone number of the subscriber terminal are in the same local access and transport area (LATA). The outgoing call data includes a telephone number of the subscriber terminal, a called party number and the at least one account code. When the call is subject to account code reporting, the SCP receives the account code, stores the outgoing call data in association with the account code, and transmits the call data to a server that is accessible by the subscriber. The method may further include terminating the call when the SCP does not receive the at least one account code.

The server is accessible by the subscriber via at least a graphical user interface (GUI) through a packet switched data network. The call data may be displayed in near real-time on the GUI. The server may be further accessible by the subscriber via an IVR unit through a telecommunications network. Also, the account code corresponding to the subscriber may be changed based on instructions received from the GUI over the data network.

Another aspect of the present invention provides a method for collecting and reporting call data based on account codes that includes storing at an SCP multiple account codes corresponding to multiple subscribers, receiving from an originating switch a query identifying an outgoing call from a terminal of one of the subscribers, and determining whether the outgoing call is subject to account code reporting based on at least whether the called party number and the telephone number of the subscriber terminal are in a single LATA. The outgoing call identification includes a telephone number of the subscriber terminal and a called party number. When the outgoing call is subject to account code reporting, the subscriber terminal is queried for entry of an account code. When the account code entered through the subscriber terminal is determined to correspond to the subscriber's account code, the SCP stores the call data relating to the outgoing call. The outgoing call may be terminated when the account code entered through the subscriber terminal does not correspond to the subscriber.

The call data includes the account code, the telephone number of the subscriber terminal and the called party number. The call data relating to the outgoing call may further include a toll charge relating to the outgoing call. The call data is provided to a service management system (SMS), which is accessible by the subscribers via a GUI through a packet switched data network.

Determining whether the outgoing call is subject to account code reporting may further include determining whether the account code reporting service corresponding to the subscriber is activated. The account code reporting service may be activated via one of the GUI and an IVR system. Also, the call data may be displayed at the GUI of the subscriber through the packet switched data network.

Providing the call data to the SMS and displaying the call data at the GUI may occur substantially simultaneously with determining that the account code corresponds to the subscriber. The displaying of the call data at the graphical user interface may also include formatting the call data into an account code report, according to formatting instructions received from the subscriber through the GUI.

Another aspect of the present invention provides a method for reporting call data for telephone calls from a subscriber telephone to a called party telephone in the same LATA (i.e., intraLATA telephone calls), based on an account code reporting service. The method includes storing at an SCP account code reporting service data for implementation of the account code reporting service in the PSTN, receiving at an originating switch an outgoing call from the subscriber terminal to the called party number, receiving a query at the SCP from the originating switch identifying the outgoing call, and determining whether the outgoing call is subject to the account code reporting service based on at least the called party number. The account code reporting service data includes at least one account code, which may be a verified account code or an unverified account code, associated with the subscriber. The identification of the outgoing call includes a telephone number of the subscriber telephone and the called party number.

When the outgoing call is subject to the account code reporting service, the method further includes prompting entry of a code through the subscriber telephone and determining whether the entered code matches the account code. When the entered code matches the account code, outgoing call data related to the call is stored. The outgoing call data includes the telephone number of the subscriber telephone, the called party number and the at least one account code. When the entered code does not match the account code and the account code is a verified account code, the call is terminated. When the entered code does not match the account code and the account code is an unverified account code, the outgoing call data is stored. The method may also include receiving at an SMS the stored outgoing call data, formatting the outgoing call data, and providing the formatted data to at least one of a GUI or an IVR system.

Another aspect of the present invention provides a system for collecting and reporting call data based on account codes. The system includes an SCP in the PSTN that stores at least one account code associated with a subscriber to an account code reporting service and an SMS configured to be accessed by the subscriber from a GUI via a data network and from an IVR system via the public switched telephone network. The SCP receives outgoing call data relating to a call from a terminal of the subscriber to a called party number within the same LATA, the outgoing call data including a telephone number of the subscriber terminal and the called party number. When the call is subject to the account code reporting service, the SCP requests a code to be entered from the subscriber terminal and determines whether the entered code matches the at least one account code associated with the subscriber. When the entered account code matches the at least one account code, the SCP stores the outgoing call data. The SCP may terminate the outgoing call from the subscriber terminal when the entered code does not match the at least one account code.

The SMS retrieves the outgoing call data from the SCP and transmits the outgoing call data to one of the GUI and the IVR system. The SMS may format the call data into an account code report according to formatting instructions received from the subscriber via the GUI. The SMS transmits the account code report to the GUI for display. The SMS may also retrieve the outgoing call data from the SCP during the outgoing call and display the outgoing call data on the GUI in near real-time.

Another aspect of the present invention provides a system for reporting call data for telephone calls from a subscriber telephone in a LATA to a called party telephone in the same LATA, based on an account code reporting service. The system includes an SCP in the PSTN that stores at least one account code associated with the subscriber, the account code being one of a verified account code and an unverified account code. The system also includes a switch that receives an outgoing call from the subscriber terminal to the called party number and queries the SCP identifying the outgoing call. The identification of the outgoing call includes a telephone number of the subscriber telephone and the called party number. The SCP prompts entry of a code through the subscriber telephone and determines whether the entered code matches the account code. When the entered code matches the account code, the SCP stores outgoing call data related to the call, the outgoing call data including the telephone number of the subscriber telephone, the called party number and the account code. When the entered code does not match the account code and the account code is a verified account code, the SCP instructs the switch to terminate the call. However, when the entered code does not match the account code and the account code is an unverified account code, the SCP stores the outgoing call data and instructs the switch to connect the call to the called party telephone.

The system may further include an SMS, connected to the SCP, which is configured to be accessed by the subscriber via at least a GUI through a packet switched data network. The SMS receives the stored outgoing call data from the SCP in near real-time and displays the received outgoing call data to the GUI. The SMS may also display the received outgoing call data according to a customized format of the subscriber. The SMS receives changes to the account code from the subscriber via one of the GUI through the packet switched data network and an IVR system through the PSTN. The SMS sends the changed account code to the SCP, which stores the changes for immediate implementation.

The various aspects and embodiments of the present invention are described in detail below.

The present invention is an AIN based system and method that enables generation of various call reports, including records of the calling number, called number and account code associated with each call from a subscriber's telephone, triggered by verified or unverified account numbers. The system and method further allow a subscriber connected to a communications network, including the Internet and other packet switched type data networks, as well as through conventional IVR systems, to customize, execute and review account code reports with near real-time access to the service data.

The account code reporting service allows subscribers to selectively authorize and identify individual calls originated from their respective telephone lines. In particular, the service categorizes intraLATA usage by enabling an account code to be entered at the time of placing the call. The account code will be captured by the reporting system and provided to the subscriber, for example, on the monthly bill. The bill summarizes charges, as is the current practice, but will additionally show detail messages with a summary by line and account code related to each call. Alternatively, a customized report containing the account codes and called number information may be designed and developed for the subscriber. In an embodiment, the subscriber may design desired report formats and access customized reports via the Internet. The account codes enable subscribers to assign usage billing into their accounting categories, and are especially useful to businesses that backbill telephone usage to customers, such as lawyers and accountants, or that closely monitor usage charges.

Figure 1:
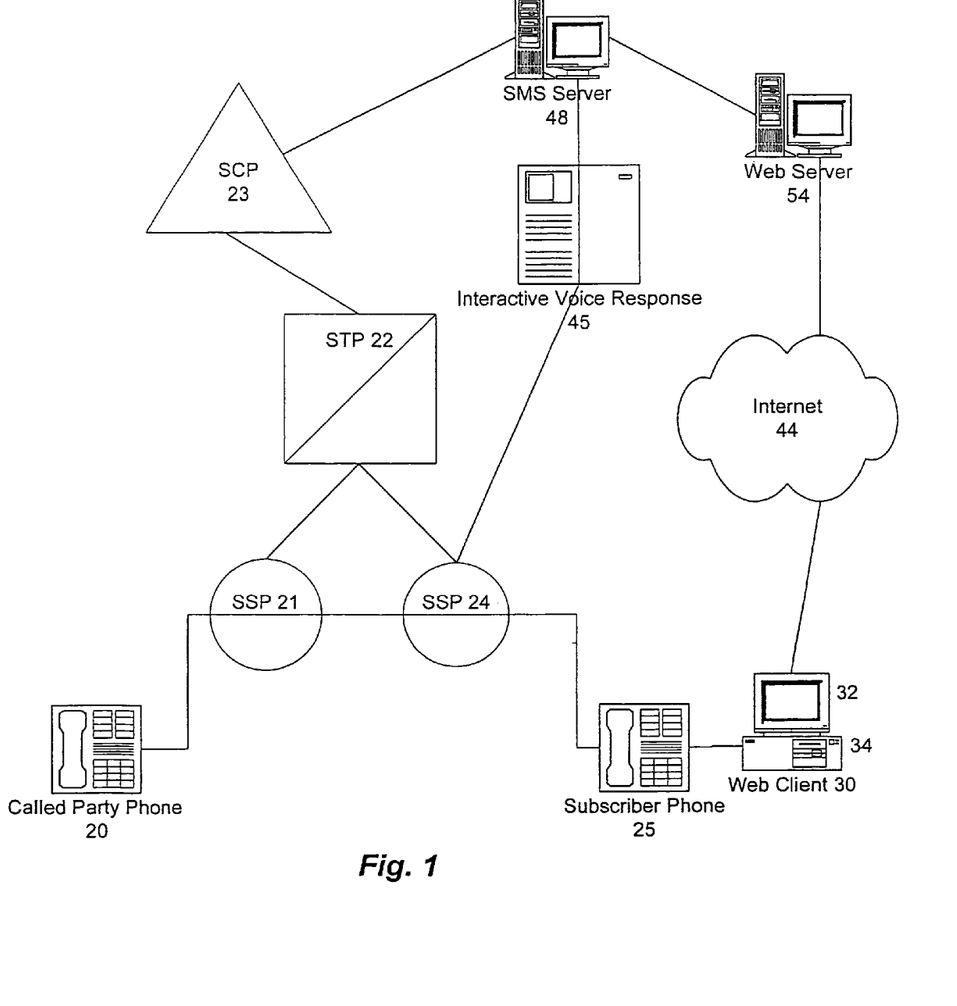
FIG. 1 is a block diagram showing an exemplary telecommunications network implementing the account codes reporting service, according to an aspect of the present invention.

FIG. 1 illustrates an exemplary telecommunications network in association with the present invention, for implementing account code reporting. The network includes a called party telephone 20, an originating service switching point (SSP) 21, a terminating SSP 24 and a subscriber telephone 25 (i.e., the calling party telephone). The subscriber telephone 25 may be any type of PSTN compatible telephone, including a plain old telephone service (POTS) telephone or a telephone in a Centrex system, a PBX system, electronic key telephone system (EKTS), or the like. The exemplary network also includes a signaling transfer point (STP) 22, an SCP 23 and an IVR 45.

By way of example, the SCP 23 is implemented with the Bellcore Integrated Service Control Point, loaded with ISCP software Version 4.4 (or higher), available from Telecordia, Murray Hill, N.J. In an alternative embodiment of the invention, the SCP 23 may be a Lucent Advantage SCP, with software release 94, available from Lucent Technologies, Inc. An exemplary IVR 45 is available under the trademark CONVERSANT System for IVR, Version 6.0, Update 1, provided by Lucent Technologies, Inc. The network alternatively incorporates any compatible stand-alone IVR or advanced intelligence network-intelligent peripheral (AIN-IP or intelligent peripheral) providing an IVR.

The SSP 24 is the originating switch for the subscriber telephone 25 and the SSP 21 is the terminating switch for the called party telephone 20. However, the originating switch and the terminating switch may be the same. The SSPs 21 and 24 may include, for example, 1AESS or 5ESS switches manufactured by Lucent Technologies, Inc.; DMS-100 switches manufactured by Nortel Networks Corporation (Nortel); AXE-10 switches manufactured by Telefonaktiebolaget LM Ericsson, or EWSD switches available from Siemens Information and Communication Networks, Inc. The switches may utilize an AIN Release 0.1 protocol. However, embodiments of the present invention may incorporate switches incorporated into alternative telecommunications technology, such as ATM switches.

The call service logic of the present invention may be upgraded to accommodate future AIN releases and protocols and future trigger types. Specifications of AIN Release 0.1 for network elements may be found in Bellcore TR-NWT-001299, Switch-Service Control Point Application Protocol Interface Generic Requirements (GR-1299 CORE), and Telecordia Technical Reference TR-NWT-001299, AIN Switching Systems Generic Requirements (GR-1298 CORE), the disclosures of which are expressly incorporated by reference herein in their entireties.

A data network of the invention includes a web client 30, a web server 54 and an SMS (SMS) 48, which are connectable through the Internet 44. The web client 30 includes a GUI 32, e.g., a personal computer (PC) or emulation terminal, operating client software 34. The SMS 48 is capable of transmitting and receiving information to and from the SCP 23. Alternatively, the client software 34 can be run at the web server 54. The SMS 48 provides the subscriber interface to the SCP 23 from both the subscriber telephone 25 (or other DTMF telephone) through IVR 45 and the web client 30 (or other Internet compatible GUI) through the web server 54, via the Internet 44. The SMS 48 also stores and distributes subscriber specific data relating to the account codes services, including account codes, account numbers, call specific data and subscriber report formats.

The web client 30 incorporates a web browser, such as Microsoft Internet Explorer, available from Microsoft Corporation, or Netscape Navigator, available from Netscape Communications Corporation. In one embodiment, the web client 30 is implemented with an IBM Pentium based PC, running the Linux operating system, available from, for example, Free Software Foundation, Inc., or the Microsoft Windows operating system, and running the Microsoft Internet Explorer, Netscape Navigator or Hotjava, available from Sun Microsystems, Inc., web browser software. An embodiment of the invention includes the web server 54 running the Linux or Microsoft Windows operating system and the Apache web server software, available from the Apache Software Foundation, or the Jigsaw web server software, available from World Wide Web Consortium (W3C).

Generally, the account code reporting service enables a subscriber to track outgoing calls made from the subscriber telephone 25. In an embodiment, the account code reporting service further includes several optional features that the subscriber customizes. Among these features is the ability to trigger the service ON and OFF over the Internet 44 or, alternatively, through the IVR 45. The account codes can also be assigned, changed and deleted by the subscriber, depending on current needs. Furthermore, the reports generated by the account code reporting system, including hard copies, such as monthly bill statements and web displays, may be designed for the subscriber's particular needs. In addition, the account code reporting service enables the subscriber to monitor call charges, in near real-time, via GUI 32, while the call from the subscriber telephone 25 proceeds.

The subscriber can modify the account code reporting service status by either of two methods. First, from any DTMF telephone, the subscriber dials a toll-free number, e.g., an 800 number, or local service provider telephone number, to access the IVR 45 within the PSTN. The subscriber is prompted to enter an account number, along with a personal identification number (PIN), further discussed below. The subscriber then has the ability to change the PIN, toggle the service ON and OFF and activate a time of day, day of week schedule for activating/deactivating the service. Second, the subscriber has the option to access the account code reporting service using the GUI 32 via the Internet 44. Over the web connection, the subscriber is able to implement all of the IVR functions identified above, as well as customize reports and report formats, build time of day, day of week schedules, and assign, change or delete account codes.

The account code reporting service may include two variations: "unverified" and "verified" account codes. The unverified account codes are 0 to 12 digits, for example, and are entered by the subscriber for all intraLATA calls. There is no verification of the unverified account codes prior to connecting the telephone call to the called party telephone 20. In fact, when the subscriber does not enter an account code, or enters an inaccurate account code, the call is still routed normally, although the report ultimately generated pursuant to the service will not include account code data on the call. The verified account codes are 2-12 digits, for example, and are entered by the subscriber for all intraLATA calls. When an appropriate verified account code is not entered or entered inaccurately, the call will not be connected. When a valid verified account code is entered, the call data will be recorded and ultimately included in the subscriber's report.

For both unverified and verified account codes, the account code digits may be entered in response to a voice announcement requesting the account code after the telephone number has been dialed. For example, if the account code service applies only to intraLATA calls, as described below, the subscriber may not be asked to enter an account code until after the SCP 23 confirms that the dialed telephone number is intraLATA (as opposed to inter-LATA or international, for example). In alternative embodiments, the digits are entered by the caller before or after dialing the outgoing telephone number, without being interactively prompted by voice announcement to do so.

Figure 2:
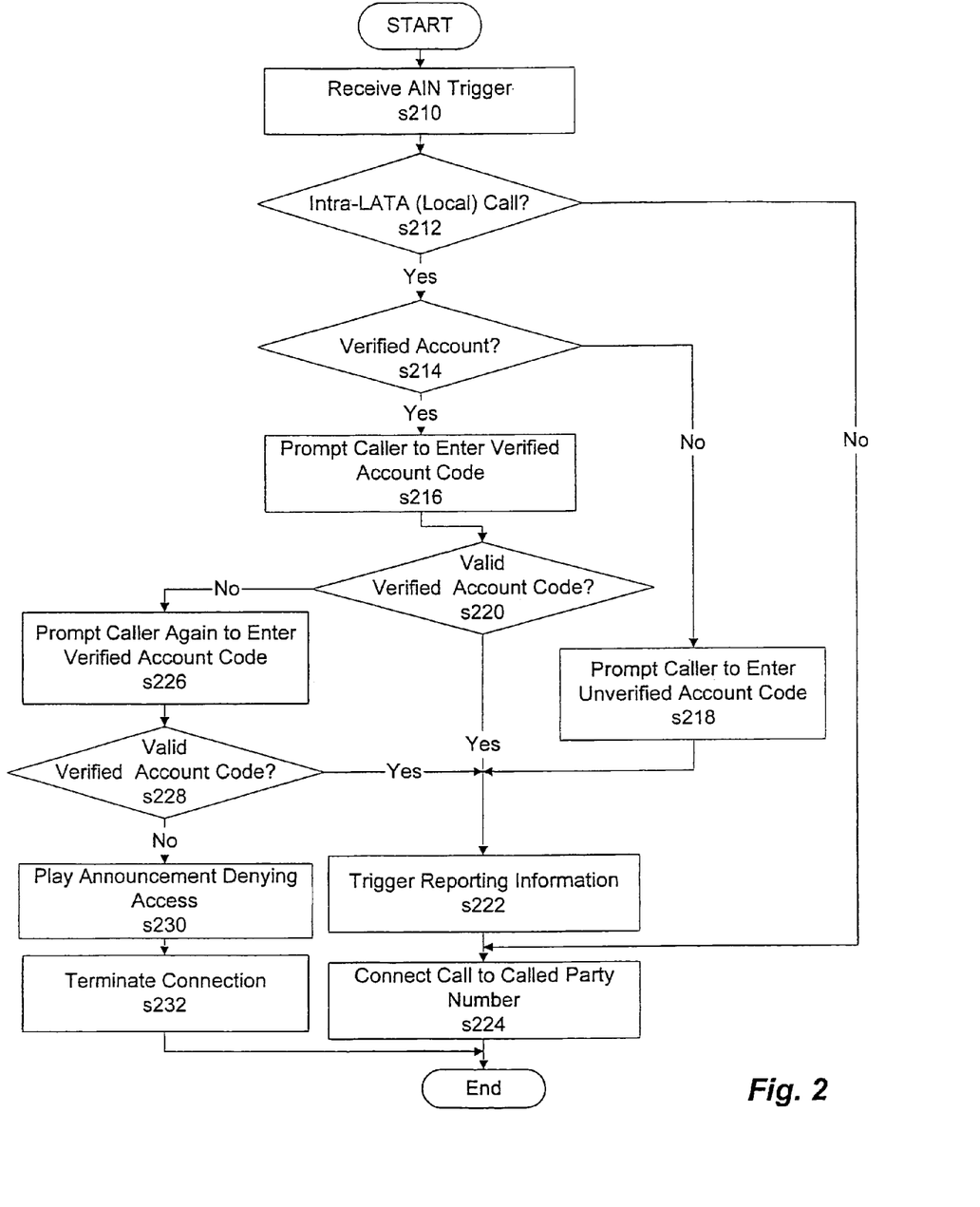
FIG. 2 is a flowchart of exemplary SCP service logic for the account codes reporting service, according to an aspect of the present invention.

FIG. 2 is an exemplary flow diagram depicting implementation of the account code reporting system from the point of view of the SCP 23, in one embodiment of the invention. At step s210, the SCP 23 receives a standard AIN prompt from the originating SSP 24 when the subscriber telephone 25 goes off hook and a number is dialed, notifying the SCP 23 of the initiation of a call. The AIN prompt includes at least the calling party number (i.e., the subscriber telephone number) and the called party number. The AIN prompt, which initiates the account code reporting service logic at the SCP 23, may be any available signaling parameter, including, for example, an off-hook delay (OHD) trigger or a custom dialing plan (CDP) trigger. Use of the OHD trigger is preferable for subscribers having a single telephone or relatively few telephones, such as a private party or a small business. Alternatively, for large subscribers, including for example Centrex customers, the CDP trigger is preferable. Note that for subscribers requiring access codes to reach an outside line, such as an "8" or a "9" in a Centrex system, no additional access code is necessary to implement the account code reporting service. Based on the calling party number in the AIN prompt, the SCP 23 determines whether the subscriber telephone 25 subscribes to the account code reporting service using, for example, an internal look-up table that associates telephone numbers with AIN services.

At step s212, the SCP 23 determines in response to the AIN trigger whether the call is an intraLATA call. For example, the SCP 23 may compare the called party number to a previously stored look-up table of telephone numbers. When the call is not an intraLATA call, the SCP 23 instructs the SSP 24 to complete the call to the called party number at step s224 with no further account code reporting service processing. In other words, the call is routed from the SSP 24 through the terminating SSP 21 to the called party telephone 20, subject to conventional call detail record keeping, as well as any other call services to which the subscriber (or the called party) subscribes.

When the SCP 23 determines that the called number is an intraLATA number, it next determines at step s214 whether the subscriber's account code reporting service requires an unverified or verified account code. The SCP 23 must first associate the account number received via the AIN trigger with the appropriate subscriber data stored in an internal database. Alternatively, the SCP 23 may interface with an external database that stores the account code service data. Use of an external database saves memory at the SCP 23, although it reduces overall efficiency of the account code service implementation.

When the subscriber's account information indicates unverified account codes, the SCP 23 directs the originating SSP 24 to play an announcement requesting entry of the unverified account code at step s218. Upon receipt of a valid unverified account code entered by the subscriber via the SSP 24, the SCP 23 triggers reporting information at step s222 and instructs the SSP 24 to connect the call to the called party telephone 20 at step s224. The reporting information may include, for example, the calling party number (i.e., the telephone number of the subscriber telephone 25), the called party number, the account code entered by the subscriber and the date and time of the call. The SCP 23 stores the reporting information for future access by the subscriber, either interactively at the subscriber's request, as discussed below, or routinely in the form of a periodic report, such as a bill.

If the SCP 23 does not receive any unverified account code or receives an unrecognized unverified account code, the SCP 23 still instructs the SSP 24 to complete the telephone call. However, no reporting information is triggered with respect to the call. In an embodiment of the invention, the subscriber is notified by announcement that the account code is missing or invalid, and is either provided a second opportunity to enter an appropriate account code or notified that no reporting information will be generated for that particular call.

When the subscriber's account information indicates the need for verified account codes, the SCP 23 directs the originating SSP 24 to play an announcement requesting entry of a verified account code at step s216. A typical announcement to prompt entry of a verified account code is as follows: "Please enter your account code followed by the number sign." The SCP 23 must then verify the verified account code at step s220 to assure that it is valid. Whether a verified account code is valid may depend on numerous factors unique to the subscriber's service. For example, verified account codes may simply restrict use of the subscriber's telephone 25 to employees, family members or other select groups, each of whom has a verified account code. A verified account code report would thus correlate called telephone numbers with the respective verified account code used to complete the call, indicating, for example, what telephone numbers were called by which employees.

In another embodiment of the invention, the verified account codes reflect restrictions on outgoing calls to pre-identified numbers (or groups of numbers) using a subset of verified account codes. The verified account codes may likewise be prioritized in tiers, the fewest restrictions on outgoing calls being associated with the highest tiers. In the event verified account codes are used to restrict outgoing calls in any manner, the SCP 23 must perform the additional step of comparing the privileges associated with the entered verified account code with the called number to confirm permission for connecting the call.

When the SCP 23 determines that the verified account code is valid, the SCP 23 triggers reporting information at step s222 and instructs the SSP 24 to connect the call to the called party 20 at step s224. The report information may include, for example, the calling party number (i.e., the telephone number of the subscriber telephone 25), the called party number, the verified account code entered by the subscriber and the date and time of the call. The SCP 23 stores the report information for future access by the subscriber, either interactively at the subscriber's request or routinely in the form of a periodic report, such as a billing report.

When the SCP 23 determines that the verified account code entered by the subscriber is not valid, it instructs the SSP 24 to again prompt the caller at step s226 to enter a verified account code. The announcement includes notification that the code initially entered is not recognized as valid. For example, a typical announcement of step s226 is as follows: "You have entered an invalid account code, please dial your account code again now, followed by the number sign." The announcement may also include notification that failure to enter a valid verified account code results in call termination. At step s228, the SCP 23 determines whether the second attempt to enter a verified account code is successful. If the verified account code is valid, reporting information is triggered at step s222 and the call is connected at step s224, as discussed above. When the verified account code is not valid, the SCP 23 instructs the SSP 24 at step s230 to play announcement denying access, for example, as follows: "The call you are attempting is not authorized." The connection is terminated at step s232.

Figure 3:
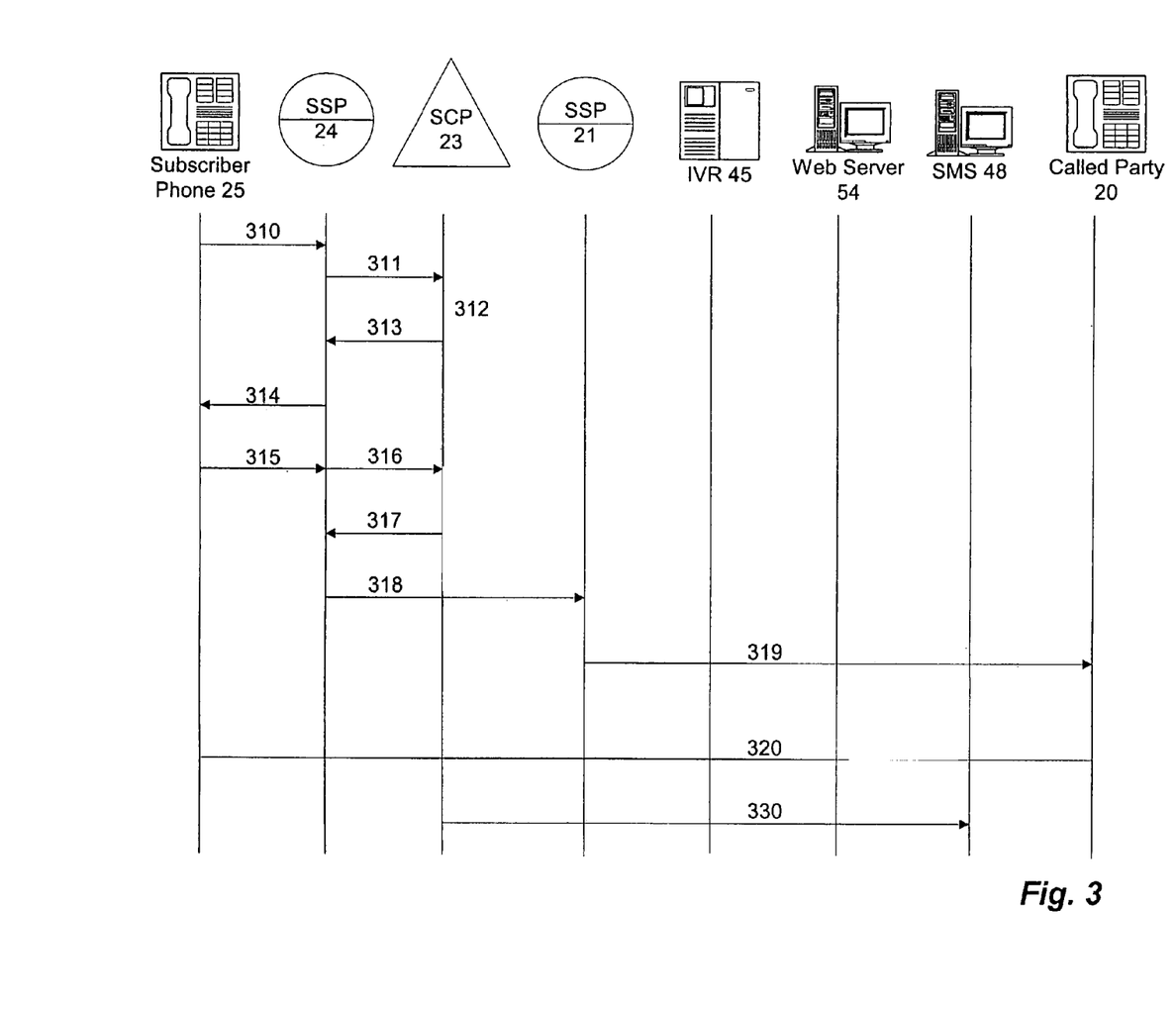
FIG. 3 is an exemplary account codes reporting service call flow diagram, showing routing of an outgoing telephone call, according to an aspect of the present invention.

FIG. 3 is a call flow diagram depicting an exemplary implementation of the account code reporting service based on verified account codes initiated by an outgoing call from the subscriber telephone 25. A caller initiates an outgoing call from the subscriber telephone 25, connecting to the SSP 24 by going off-hook at step 310. Upon receiving a dial tone, the caller dials the digits of the called party number. In response, the SSP 24 suspends the call and launches an OHD trigger to SCP 23 at step 311 (except for calls to predetermined emergency numbers, such as "911," for example). The trigger causes the SSP 24 to transmit an AIN query message, including the calling party number and called party number, via the SS7 network and the appropriate STP 22 (not picture in FIG. 3) to the subscriber's serving SCP 23.

At step 312, the SCP 23 collects information from the OHD trigger and determines whether the particular subscriber has the account code reporting service based on the calling party number and, if so, determines whether the telephone call is intraLATA, thus triggering the account code requirement. When the SCP 23 determines that the call is intraLATA, it determines whether the account code to be entered by the caller is verified or unverified. For purpose of the example depicted in FIG. 3, it is assumed that the SCP 23 determines that the subscriber's service requires verified account codes. The SCP 23 then instructs the SSP 24 at step 313 to play an announcement requesting entry of the verified account code, which the SSP 24 does at step 314.

The caller dials the verified account code, which is received by the SSP 24 at step 315 and forwarded to the SCP 23 at step 316. The SCP 23 verifies the verified account code using, for example, a look-up table of verified account codes associated with the subscriber telephone 25, and instructs the SSP 24 to connect the call at step 317. The SSP 24 accordingly routes the call to the terminating SSP 21 at step 318, which rings the called party telephone 20 at step 319. When the called party telephone 20 goes off-hook, the final connection 320 is established between the subscriber telephone 25 and the called party telephone 20 through the SSP 24 and the SSP 21.

Meanwhile, the SCP 23 stores information related to the telephone call, including the calling party number, the called party number, the verified account code and the date and time of the call. Furthermore, the SCP 23 stores the call completion date and time (if the call is answered by the called party telephone 20), so that call duration can be determined. The call duration is calculated either by the SCP 23 or the SMS 48, after the stored information is transmitted from the SCP 23 to the SMS 48, as indicated in step 322, discussed below. At a predetermined time, designated by the service provider, the SCP 23 exports the stored information, including the verified account code associated with the telephone call, for purposes of generating a bill, or similar report.

The report information may be assembled using any conventional billing system (not pictured), such as a carrier access billing system CABS or similar operations support system, based on automatic measure assignment (AMA) data generated by the SCP 23. The billing system receives the account code information on an AMA tape, for example, and processes and details the information on the subscriber's periodically generated bill. The information stored at the SCP 23 includes data relating to other verified account code telephone calls made from the subscriber telephone 25 during the predetermined reporting period, as well.

In addition, at step 330, the SCP 23 transmits the stored information related to the telephone call, including the calling party number, the called party number, the verified account code and date and time, to the SMS server 48 as the call progresses. In other words, essentially at the same time the SCP 23 instructs the SSP 24 to connect the call at step 316, the SCP 23 begins sending the call data to the SMS 48, which can be immediately accessed by the subscriber through the web client 30 and web server 54. In an embodiment of the invention, the SMS 48 is programmed to calculate and continuously update the intraLATA toll charges during the call, likewise making the charge data available to the subscriber. Alternatively, the SCP 23 calculates and continuously updates the intraLATA toll charges during the call, and exports the charge information to the SMS 48 at step 330 along with the other telephone call information. The SMS 48 stores the exported information, regardless of whether the information is accessed in near real-time, for future reference by the subscriber, discussed below. When the call disconnects, the SMS 48 receives the stop date and time, and calculates the call duration, as well as the associated final charge for the call.

Figure 4:
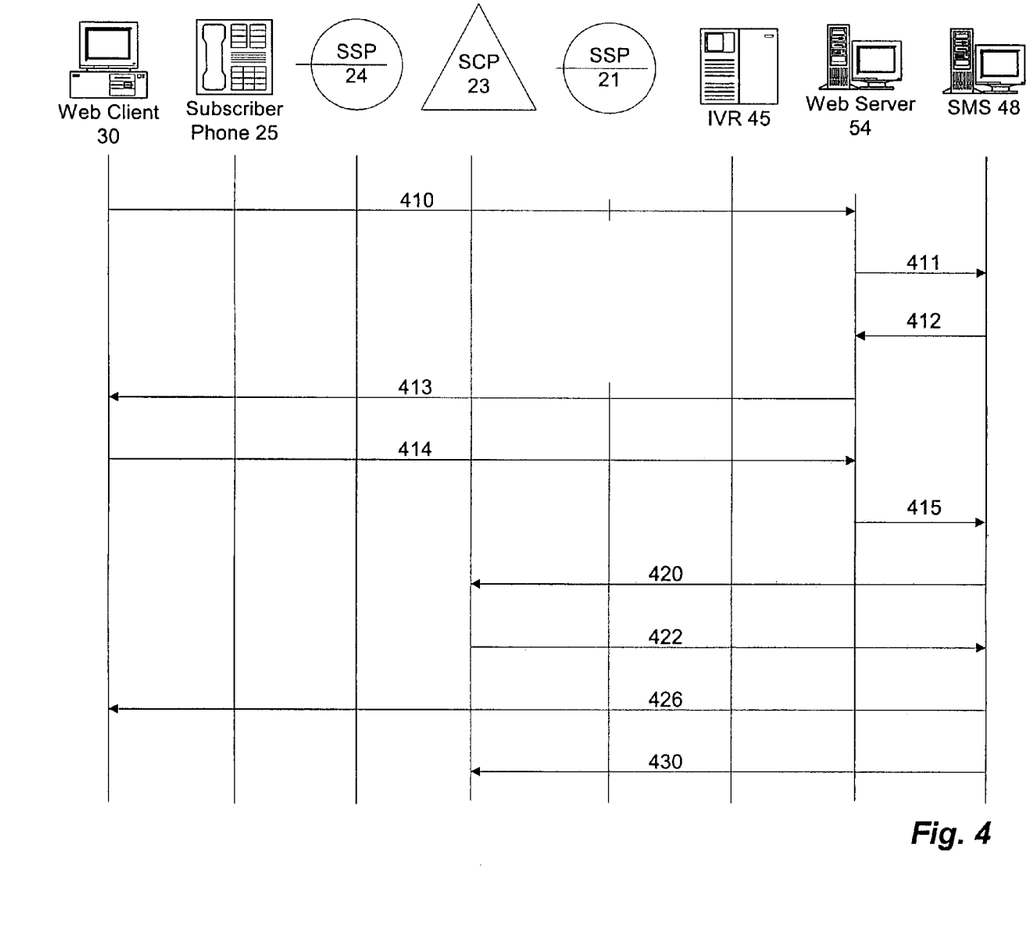
FIG. 4 is an exemplary call flow diagram in which the subscriber accesses the account codes reporting service via the Internet, according to an aspect of the present invention.
Figure 5:
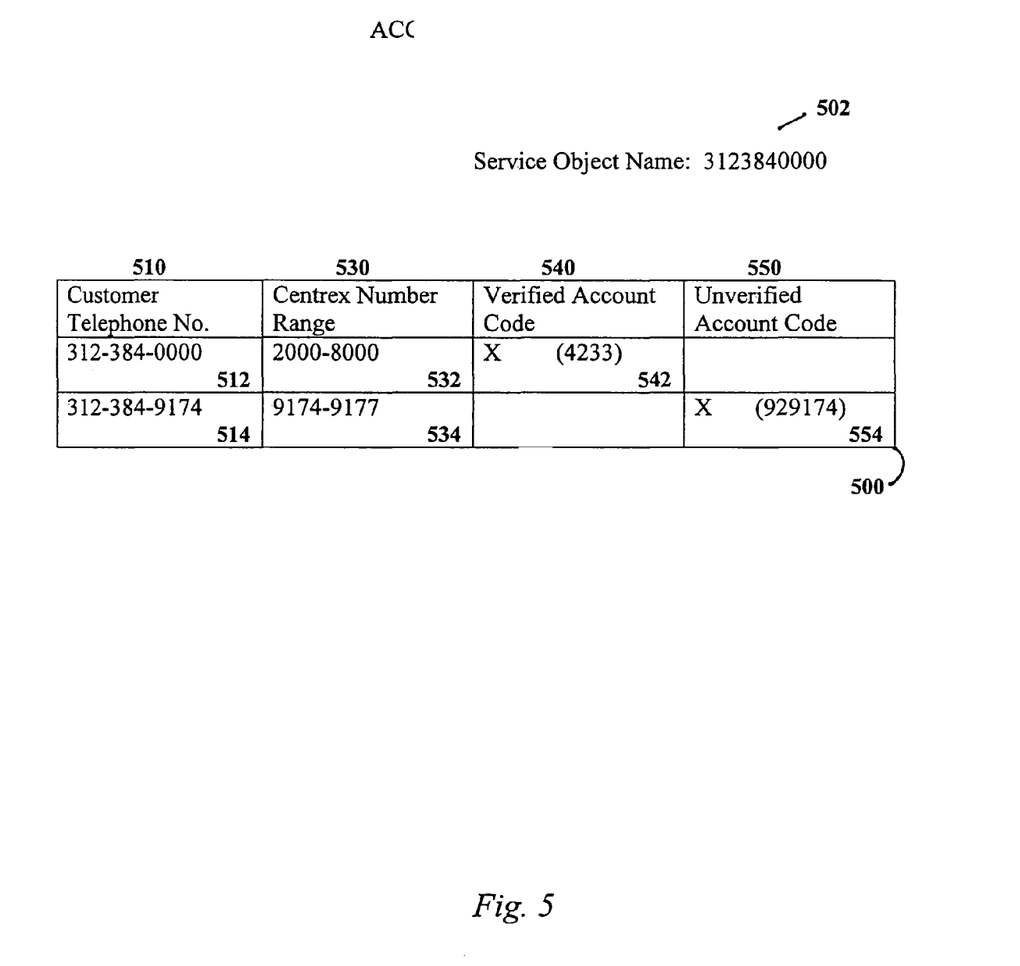
FIG. 5 is an exemplary web page to be displayed at the subscriber's GUI showing assignment of verified and unverified account codes in a Centrex system, according to an aspect of the present invention.
Figure 6:
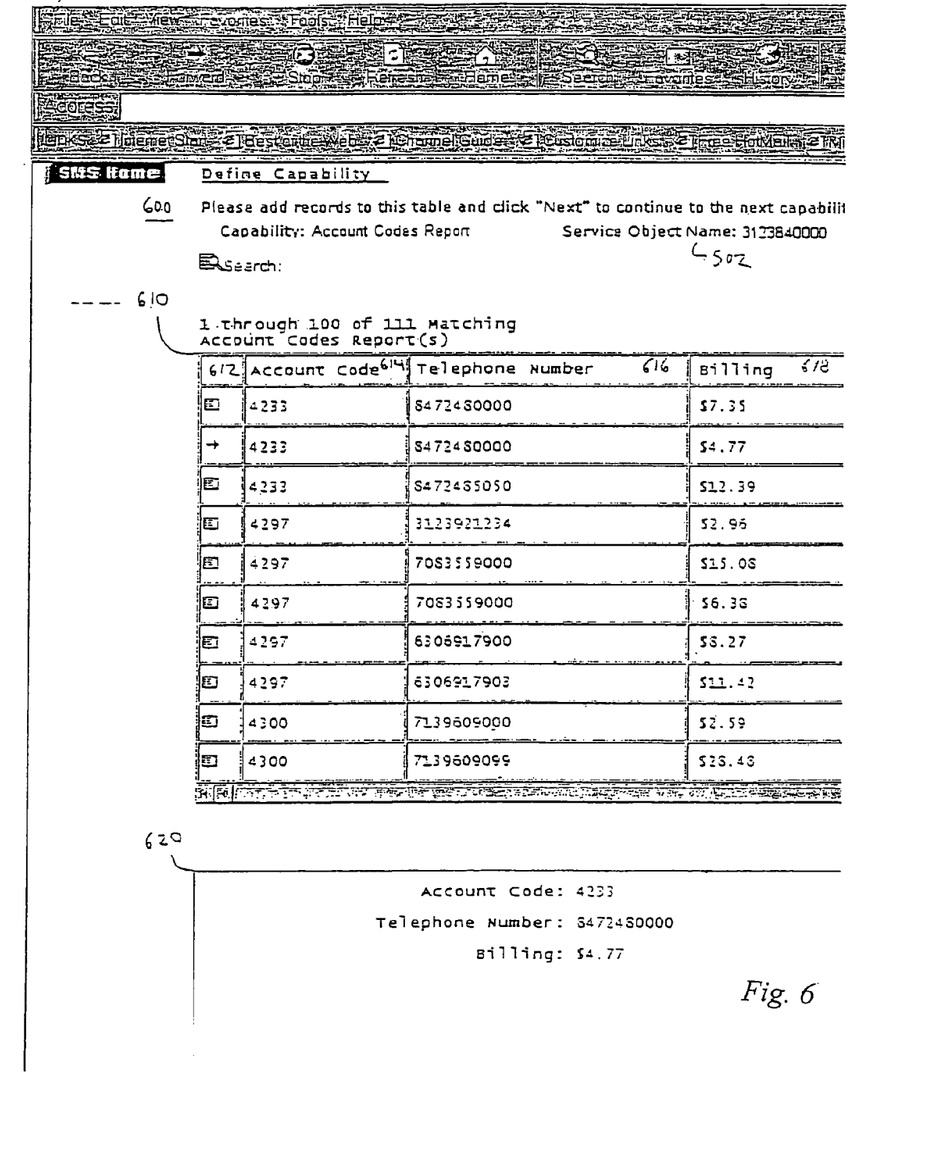
FIG. 6 is an exemplary web page to be displayed at the subscriber's GUI showing a typical report of the account code reporting service, according to an aspect of the present invention.
Figure 7:
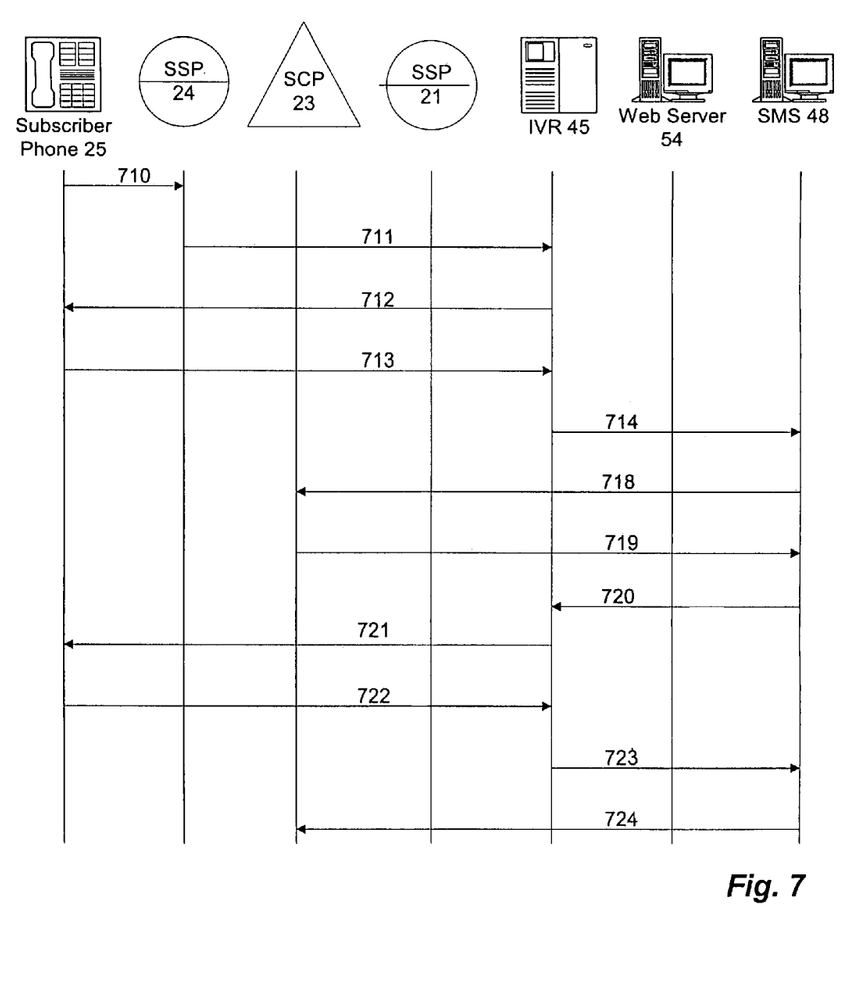
FIG. 7 is an exemplary call flow diagram in which the subscriber accesses the account codes reporting service via an IVR, according to an aspect of the present invention.

FIG. 4 is a call flow diagram depicting an exemplary interaction between the subscriber and the account code reporting service by accessing the SMS 48 over the Internet. In order for the subscriber to interact with the account code reporting service via the Internet 44, the subscriber accesses a unique uniform resource locator (URL) associated with the service provider. The URL is an address that identifies the appropriate protocol for communicating with the service over the World Wide Web. When the subscriber accesses the Internet 44, the web server 54 provides account code reporting service web screens, transmitted from the SMS 48, examples of which are shown in FIGS. 5-7. In an embodiment, an alternative manner for accessing the account code reporting service via the Internet 44 is through the PCM service, described in U.S. patent application Ser. No. 09/716,276 to Thomas ADAMS et al., filed on Nov. 21, 2000.

At step 410 of FIG. 4, the subscriber accesses the account code reporting service data by connecting from the web client 30 to the web server 54 via the Internet 44. The web server 54 then connects to the SMS 48, which stores and updates the account code reporting service data, as well as associated authentication data, at step 411. Once connected to the SMS 48 via the web server 54, the subscriber must be authenticated to access the corresponding account. The SMS 48 queries the subscriber for authentication data, which may include an account number and associated personal identification number (PIN), via the web server 54, at steps 412 and 413. The subscriber responses are received at the web server 54 at step 414, and forwarded to the SMS 48 for authentication at step 415. Alternatively, the web server 54 may perform the authentication step based on information sent from SMS 48. The SMS 48 retrieves the account number and associated PIN information to confirm that the subscriber is authorized to access the account information.

After a successful authentication, the SMS 48 queries the SCP 23 for the data associated with the subscriber's account code reporting service account at step 420. The SCP 23 retrieves the subscriber's account code reporting service data and the calling data associated with the outgoing calls that were subject to account code verification, and transmits the retrieved data to the SMS 48 at step 422. The SMS 48 or the SCP 23 may also query a names database, such as a line information database (LIDB), to associate names with the various called party numbers included in the account code reporting service data.

In an embodiment of the invention, the SMS 48 maintains a database of all of the account code reporting service data related to each subscriber, and merely updates the data from the SCP 23 during each interaction. Alternatively, the SCP 23 periodically transmits all account code reporting service data related to each subscriber regardless of whether the subscribers have actually requested their respective account data from the SMS 48. The SMS 48 would then be able to provide the subscriber with relatively recent data without performing steps 420 and 422, which saves additional processing by the SCP 23. Steps 420 and 422 would be performed only when the subscriber specifically requests the most recent data or real time interaction, discussed below.

Once the SMS 48 has the account code reporting service data related to the subscriber's account, an interactive connection is maintained at step 426 among the SMS 48, the web server 54 and the web client 30. For example, the web server 54 receives HTTP messages from the subscriber at web client 30 and provides HTML web pages in response to the subscriber's input. The web pages relate to the subscriber's account code reporting service, as indicated by the SMS 48. Whenever the subscriber logs off the account code reporting service web site, disconnecting the web sever 54 from the SMS 48, the SMS 48 automatically updates the SCP 23 at step 430 with the information provided by the subscriber. The SMS 48 may also provide updated information to the SCP 23 while to subscriber is on-line, either periodically or in response to a specific command by the subscriber to do so. The SCP 23 stores the updated information received from the SMS 48 for immediate implementation in the PSTN.

FIGS. 5 and 6 are exemplary web pages provided the web client 30 by the SMS 48 by way of web server 54, according to an embodiment of the present invention. The actual layout of the web pages, as well as the specific options made available to the subscriber on the web pages, may vary. Web pages may enable a wide variety of functionality, including assigning and changing account codes, changing PINs, designing report formats and activating/deactivating the service based on schedules. FIG. 5 is an exemplary web page for the account code reporting service that shows assignment information of verified and unverified account codes in a Centrex system of the subscriber. The account code web screen includes a table 500 for associating the account code with various subscriber telephone numbers.

The subscriber in the example depicted by FIG. 5 is a Centrex customer, having several telephone terminals and associated telephone numbers. The primary telephone number of the subscriber is 312-384-0000, shown as the Service Object Name 502, which may also be the subscriber's account number. The column 510 of table 500 indicates the subscriber telephone numbers to which the various account codes apply. The first row of table 500 applies to telephone calls from the subscriber telephone number 312-384-2000, as indicated by entry 512. The second row of table 500 applies to another subscriber telephone number in the same Centrex account, 312-384-9174, as indicated by entry 514.

Because the subscriber is a Centrex customer, the telephone number includes numerous extensions corresponding, for example, to different employees or departments. Column 530 includes the specific extensions to which an account code, shown in column 540 or column 550, is applied. Entry 532 contains the range of Centrex extensions 2000-8000 of telephone number 513-384-0000, to which the verified account code of entry 542 is applicable. When the account code applies to only one extension, that extension is indicated in column 530. To initiate the account code, the subscriber simply types in the applicable extensions in entry 532 and clicks on the "X" in entry 542. The subscriber then enters a customized verified account code (up to 12 digits) for callers from the identified range of extensions to enter when making interLATA calls. In the example of FIG. 5, the verified account code is 4233.

Entry 534 of table 500 indicates a much smaller range of Centrex extensions, i.e., extensions 9174-9177. Also, the account code for these extensions is an unverified account code, as indicated by the "X" and the digits 929174 in entry 554. As stated above, the unverified account code does not need to be entered in order to enable an outgoing telephone call from the identified extensions. Because of the relatively few extension numbers, the particular unverified account code may likely be used for call tracking purposes, as opposed to billing purposes. For example, the four extensions to which the account code of entry 554 applies may be dedicated to a sales department for the local area and the account codes are used to track the sales persons' performance from a call quantity standpoint.

FIG. 6 is an exemplary account codes report page of the account code reporting service. Web screen 600 includes the same service object number (e.g., account number) 502 as displayed in web screen 500. Table 610 of the web screen 600 displays the actual account codes report encompassing a time period identified by the subscriber. Although not pictured on web page 600, the subscriber is able to display and sort the information in table 610 according to any available data field, including dates, time periods, verified and unverified account codes, called telephone numbers, Centrex extension numbers, and the like.

Column 614 of table 610 lists the account codes that have been used to place calls during the subject time period. The account codes in column 614 are displayed in increasing numerical order from top to bottom, indicating that the subscriber has elected to sort the report information based on account code. Column 616 includes the called telephone number associated with each account code call placed during the identified time period, in chronological order. For example, account code 4233 was used to place two telephone calls to 847-248-0000 and one telephone call to 847-248-5050. Column 618 includes the billing associated with each of the calls. In an embodiment of the invention, the table 610 would further include the duration of each call, including dates and start and stop times.

Column 612 enables the subscriber to select desired rows from table 610 to be displayed in summary form in the box 620 at the bottom of the web page 600. When the subscriber clicks on the icon in column 612 next to the desired row, the icon is replaced by an arrow indicator and the corresponding information appears in the box 620. The subscriber is able to select any number of rows for display, in which case the information of the selected entries will be consolidated. For example, when the subscriber selects all rows corresponding to telephone calls made to 847-248-0000, the associated billing for the calls is aggregated.

Exemplary steps by which the subscriber alternatively interacts with the account code reporting service using the IVR 45 are shown in FIG. 7. As stated above, access through the IVR 45 is slightly limited in that the subscriber cannot actually build or edit customized reports or weekly schedules using the IVR 45. Also, the subscriber is not able to monitor, in real-time, the toll charges associated with the ongoing telephone call. However, the subscriber can access all other features of the account code reporting service including changing the PIN, toggling the service ON or OFF, and activating/deactivating the customized reports and schedules.

Referring to FIG. 7, the subscriber calls a toll free number from subscriber telephone 25, which accesses the IVR 45 via the SSP 24, shown at steps 710 and 711. FIG. 7 depicts, for example, the call originating from the subscriber telephone 25, although the subscriber may access the IVR 45 from any DTMF telephone. Also, the call may be routed through a number of intervening switches in the PSTN to reach the IVR 45. Once the IVR 45 receives the call, it initiates a request for various authentication information, such as the account number and a PIN number, at step 712 (although communications between the subscriber telephone 25 and the IVR 45 pass through the SSP 24, this step is omitted for convenience). The account number and the PIN, which may be the same as the account number and PIN used to access the account code reporting service via the Internet 44, are entered by the subscriber using the touch tones of the subscriber telephone 25 at step 713. The pre-programmed voice announcements for this aspect of the invention reside in the IVR 45, and implementation of the voice announcements is known. The IVR 45 forwards the information to the SMS 48 at step 714 for authentication.

After authentication, the SMS 48 queries the SCP 23 at step 718 and retrieves the current service data for the account code reporting service, including current schedules, at step 719. As discussed above, in an alternative embodiment, the SMS 48 maintains a database of all of the account code reporting service data related to each subscriber, and merely updates the data from the SCP 23 during each interaction. Alternatively, the SCP 23 periodically transmits all account code reporting service data related to each subscriber regardless of whether the subscribers have actually requested their respective account data from the SMS 48, enabling the SMS 48 to provide updated data without actually querying the SCP 23.

The SMS 48 then provides the IVR 45 with the data specific to the subscriber at step 720. In an embodiment of the invention, the SMS 48 provides the IVR 45 with only portions of the subscriber's data in response to specific requests by the IVR 45. For example, if the subscriber responds to the IVR 45 by indicating that he only wants to turn the account code reporting service OFF, the SMS 48 does not transmit all of the scheduling data to the IVR 45.

The IVR 45 verbally recites a menu of options to the subscriber at step 721 based on the information received from the SMS 48. The options include, for example, changing the PIN, turning the account code reporting service ON or OFF, and scheduling a date and a time for activating the account code reporting service in the future. The options may also include changing report formats with respect to the calling data. For example, if the subscriber has previously built a variety of reports, designated for example, 1 through 5, the subscriber is able to selectively activate one of the reports, including a scheduled ON and OFF time, if desired. Further, the subscriber may request and receive calling data information from the IVR 45. For example, the IVR 45 may provide the option to receive the billing information related to the last intraLATA telephone called placed from the subscriber telephone 25.

The information is provided by the subscriber in response to the voice generated options of the IVR 45 at step 722 by the subscriber depressing the touch tone keys of the DMTF telephone. The IVR 45 forwards the responses to the SMS 48 for updating the subscriber's account at step 723. At step 724, the SMS 48 updates the SCP 23, if necessary, which stores the updated information for immediate implementation in the PSTN. For example, if the subscriber enters that the account code reporting service is to be ON, the SMS 48 will immediately forward the activation information to the SCP 23, which will immediately begin requesting entry of account codes for the appropriate outgoing calls and storing the call data.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. Accordingly, the invention is considered to include a tangible storage medium as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

What is claimed is:

1. A computer readable medium storing a program for tracking calls from a calling party to called parties within a local access and transport network (LATA) as the calling party, according to an intraLATA call tracking service, the medium comprising:
   a call data receiving code segment that receives call data for an intraLATA call from the calling party;
   an account code receiving code segment that receives an account code from the calling party only when the call is determined to be the intraLATA call;
   a storing code segment that stores the account code, the call data, and a time associated with the intraLATA call; and
   a reporting code segment that exports the stored data.

2. The medium for tracking calls according to claim 1, further comprising:
   a generating code segment that generates a report based on the stored data; and
   a transmitting code segment that sends the report, via a packet switched data network, to a graphical user interface associated with the calling party.

3. The medium for tracking calls according to claim 1, further comprising:
   a comparing code segment that compares the received account code with a previously stored account code; and
   a processing code segment that, when the received account code matches the previously stored account code, continues processing of the call, and when the received account code does not match the previously stored account code, discontinues processing of the call.

4. The medium for tracking calls according to claim 1, in which the call comprises an intraLATA toll call and the stored data further comprises a charge associated with the call.

5. The medium for tracking calls according to claim 1, further comprising:
   a processing code segment that, when the received account code matches a previously stored account code, continues processing of the call, and when the received account code does not match the previously stored account code, also continues processing of the call.

6. The medium for tracking calls according to claim 5, further comprising:
   a prompting code segment that, when the received account code does not match the previously stored account code, notifies the calling party that no reporting information will be generated, and the storing code segment stores no information.

7. The medium for tracking calls according to claim 1, in which the stored data comprises a calling party number, a called party number, the account code, a date and time of the call, and a duration of the call.

8. The medium for tracking calls according to claim 7, further comprising:
a generating code segment that generates a report based on the stored data; and
a transmitting code segment that periodically sends the report to the calling party.

9. A computer readable medium for storing a computer program that enables collection of data relating to outgoing intraLATA calls, placed from a terminal of an account code service subscriber, the computer readable medium comprising:
a signaling data receiving code segment that receives signaling data relating to an outgoing call from the subscriber terminal, the signaling data indicating at least a calling party number and a called party number;
an account code receiving code segment that receives an account code entered at the subscriber terminal, when the calling party number and the called party number are in the same LATA;
a verifying code segment that determines whether the received account code matches at least one predetermined account code associated with the subscriber;
a storing code segment that stores at least a portion of the signaling data in association with the at least one predetermined account code; and
a terminating code segment that initiates termination of the outgoing call when the account code receiving code segment does not receive the code entered by the subscriber or the verifying code segment determines that the code entered by the subscriber does not match the at least one predetermined account code.

10. The computer readable medium according to claim 9, further comprising a transmitting code segment that transmits the stored data to a first server that is accessible by the subscriber via at least a graphical user interface through a packet switched data network.

11. The computer readable medium according to claim 10, in which the transmitting code segment also transmits the stored data to a second server that is accessible by the subscriber via an interactive voice response unit through a telecommunications network.

12. The computer readable medium according to claim 10, in which the stored data is accessible by the subscriber via the graphical user interface in near real-time.

13. The computer readable medium according to claim 10, further comprising an instruction receiving code segment that receives instructions to change the least one account code associated with the subscriber via the graphical user interface.

14. The computer readable medium according to claim 11, in which the account code service is activated via one of the graphical user interface and the interactive voice response unit.

15. A computer readable medium storing a program for a call tracking and controlling service, the service executing when a calling party calls called party numbers within the same local access and transport area (LATA) of the calling party, the calling party having an at least one associated account code comprising one of a verified account code for tracking and controlling the calls and an unverified account code for tracking the calls, the medium comprising:
a data receiving code segment that receives data relating to an outgoing call from the calling party, the data indicating the calling party number and a called party number;
a prompting code segment that, when the calling party number and the called party number are in the same LATA, requests entry of a predetermined account code associated with the calling party number and receives an account code entered by the calling party;
a storing code segment that stores the data in association with the predetermined account code;
a verified/unverified determining code segment that determines whether the predetermined account code is a verified account code or an unverified account code;
a terminating code segment that, when the predetermined account code is a verified code and the entered account code does not match the predetermined account code, terminates the call;
a verified code processing code segment that, when the predetermined account code is a verified code and the entered account code matches the predetermined account code, processes the call; and
an unverified code processing code segment that, when the predetermined account code is an unverified account code, processes the call.

16. The medium for tracking and controlling calls according to claim 15, further comprising:
a transmitting code segment that provides the stored data to at least one of a graphical user interface and an interactive voice response system.

17. The medium for tracking and controlling calls according to claim 16, further comprising:
an instruction receiving code segment that receives instructions to activate the tracking and controlling service via at least one of the graphical user interface and the interactive voice response system.

18. The medium for tracking and controlling calls according to claim 15, further comprising a duration code segment that calculates a duration of completed calls and stores the duration data in association with the entered account code for each completed call.

19. The medium for tracking and controlling calls according to claim 15, further comprising:
a predetermined account code receiving code segment that initially receives the predetermined account code associated with the calling party via a web server, accessible by a graphical user interface over a packet switched data network.

20. The medium for tracking and controlling calls according to claim 19, in which the packet switched data network comprises the Internet.

* * * * *